(12) United States Patent
Menceloglu

(10) Patent No.: US 12,507,695 B2
(45) Date of Patent: Dec. 30, 2025

(54) QUATERNARY AMMONIUM ORGANOSILANE HYDROLYSATE AND A METHOD FOR PREPARING SAME

(71) Applicant: SABANCI UNIVERSITESI, Istanbul (TR)

(72) Inventor: Yusuf Ziya Menceloglu, Istanbul (TR)

(73) Assignee: SABANCI UNIVERSITESI, Istanbul (TR)

( * ) Notice: Subject to any disclaimer, the term of this patent is extended or adjusted under 35 U.S.C. 154(b) by 595 days.

(21) Appl. No.: 17/914,405

(22) PCT Filed: Mar. 25, 2021

(86) PCT No.: PCT/TR2021/050269
§ 371 (c)(1),
(2) Date: Sep. 26, 2022

(87) PCT Pub. No.: WO2021/194458
PCT Pub. Date: Sep. 30, 2021

(65) Prior Publication Data
US 2023/0104765 A1  Apr. 6, 2023

(30) Foreign Application Priority Data
Mar. 26, 2020 (TR) .................. 2020/04756

(51) Int. Cl.
*A01N 55/00* (2006.01)
*A01P 1/00* (2006.01)

(52) U.S. Cl.
CPC ............. *A01N 55/00* (2013.01); *A01P 1/00* (2021.08)

(58) Field of Classification Search
CPC .................................. A01N 55/00; A01P 1/00
See application file for complete search history.

(56) References Cited

U.S. PATENT DOCUMENTS

| | | | |
|---|---|---|---|
| 4,845,256 A | 7/1989 | Mebes et al. | |
| 5,411,585 A | 5/1995 | Avery et al. | |
| 6,120,587 A | 9/2000 | Elfersy et al. | |
| 8,541,610 B2 * | 9/2013 | Taralp | C07F 7/1892 556/413 |
| 8,999,357 B2 * | 4/2015 | Elfersy | D06M 11/50 514/642 |
| 2009/0074971 A1 * | 3/2009 | McMahon | D06M 16/00 427/314 |

FOREIGN PATENT DOCUMENTS

| | | |
|---|---|---|
| GB | 1233854 A | 6/1971 |
| WO | 2006086271 A2 | 8/2006 |
| WO | 2007099144 A2 | 9/2007 |
| WO | 2009030641 A1 | 3/2009 |

OTHER PUBLICATIONS

Guangmiao Qu, Jiecheng Cheng, Jijun Wei-Tao Yu, Wei Ding, Huoxin Luan. "Synthesis, Characterization and Surface Properties of Series Sulfobetaine Surfactants," J Surfact Deterg (2011) 14:31-35. (Year: 2011).*

J. Chojnowski, et al. "Polysilsesquioxanes and Oligosilsesquioxanes Substituted by Alkylammonium Salts as Antibacterial Biocides," Journal of Inorganic and Organometallic Polymers and Materials, vol. 16, No. 3, Sep. 2006, 219-230. (Year: 2006).*

Guangmiao Qu, et al., Synthesis, Characterization and Surface Properties of Series Sulfobetaine Surfactants, Journal of Surfactants and Detergents, 2011, pp. 31-35, vol. 14.

* cited by examiner

*Primary Examiner* — Michael P Cohen
(74) *Attorney, Agent, or Firm* — Bayramoglu Law Offices LLC

(57) ABSTRACT

A high stability formulation in the form of an aqueous mixture is disclosed. The formulation containing a quaternary ammonium organosilane hydrolysate includes the structure $A(CH_3)_2N^+(CH_2)_3Si(OZ)_{3-n}(OH)_n$, wherein "A" is a saturated or unsaturated aliphatic chain having 12 to 18 carbons, "n" is an integer ranging from 0 to 2, "Z" is methyl or ethyl. A method to obtain the formulation includes a first reaction in which the tertiary amine group having the structure $A(CH_3)_2N$ is quaternized by alkylation with a reactant having the structure $(CH_2)_3Si(OR)_3X$, wherein X is halogen. Then, a second reaction is performed in which the tertiary amine remaining unreacted in the first reaction is quaternized with one or more supplementary reactants selected from benzyl chloride, benzyl bromide, benzyl iodide, vinyl benzyl chloride, vinyl benzyl bromide, vinyl benzyl iodide, epichlorohydrin, epibromohydrin, epiiodohydrin, chloroethanoic acid, bromoethanoic acid, iodoethanoic acid, and sultones, preferably 1,3-propane sultone or 1,4-butane sultone.

20 Claims, 11 Drawing Sheets

QUATERNARY AMMONIUM ORGANOSILANE HYDROLYSATE AND A METHOD FOR PREPARING SAME

CROSS REFERENCE TO THE RELATED APPLICATIONS

Figure 1A:
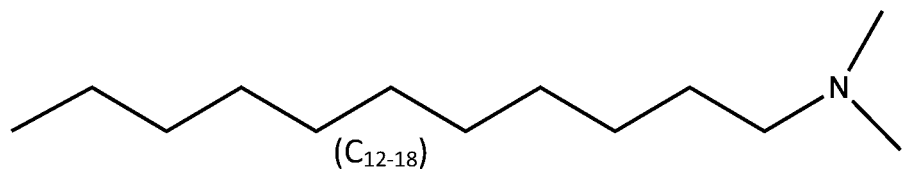
Figure 1B:
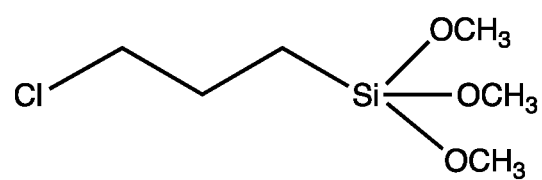
Figure 2A:
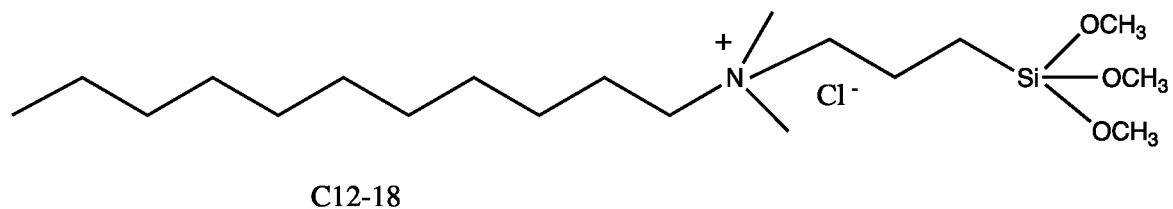
Figure 2B:
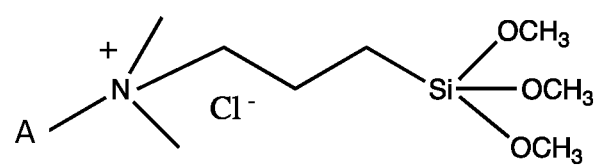
Figure 3A:
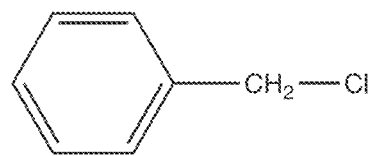
Figure 3B:
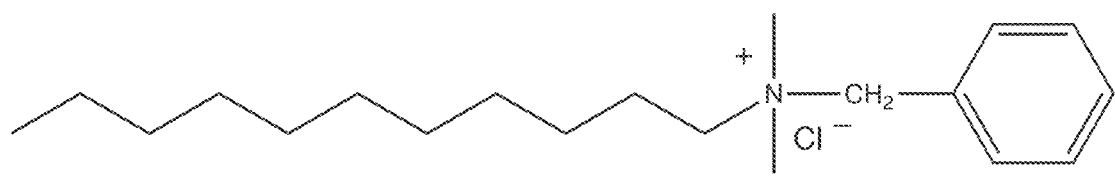
Figure 3C:
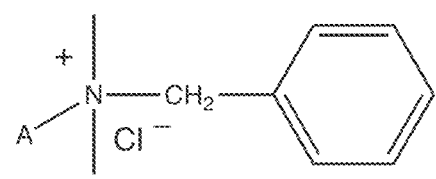
Figure 4A:
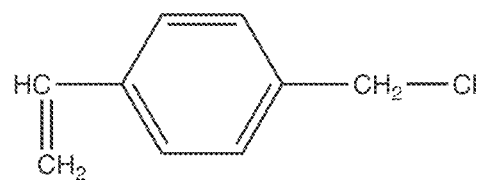
Figure 4B:
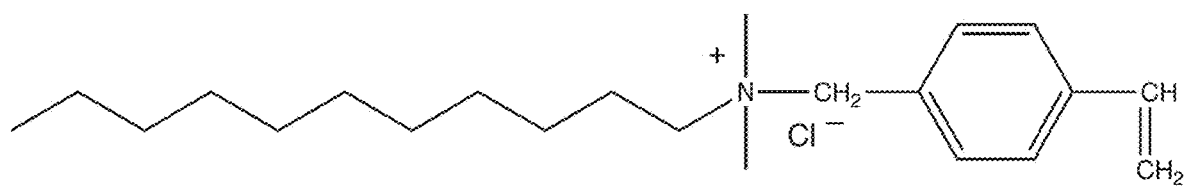
Figure 4C:
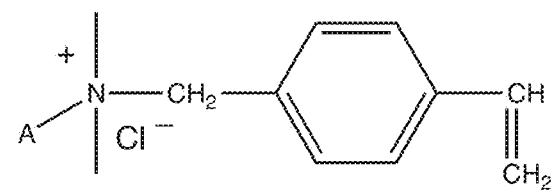
Figure 5A:
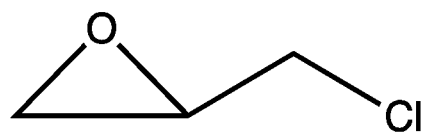
Figure 5B:
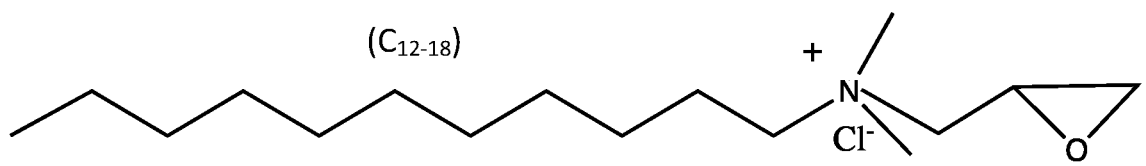
Figure 5C:
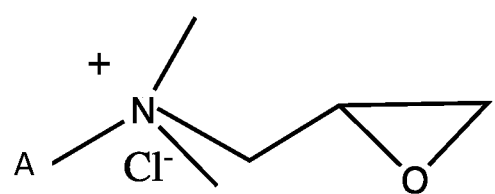
Figure 6A:
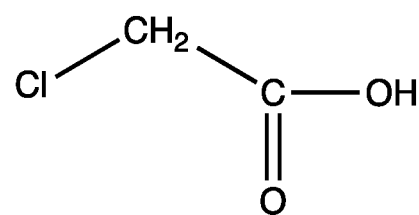
Figure 6B:
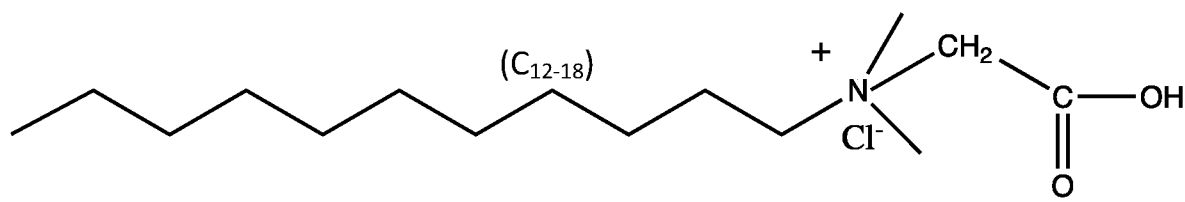
Figure 6C:
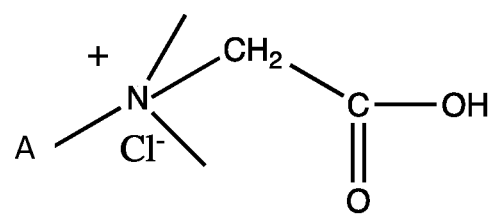
Figure 7A:
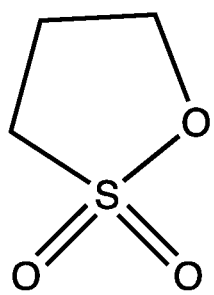
Figure 7B:
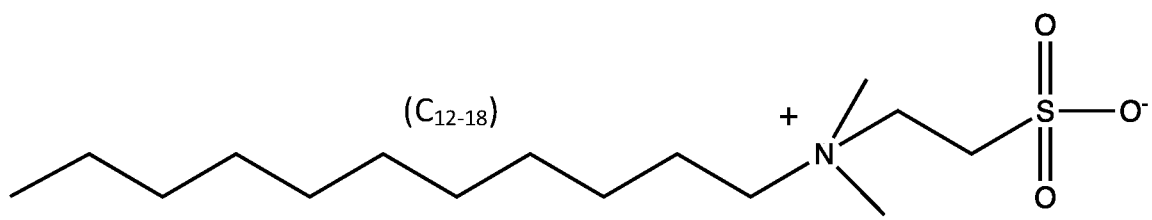
Figure 7C:
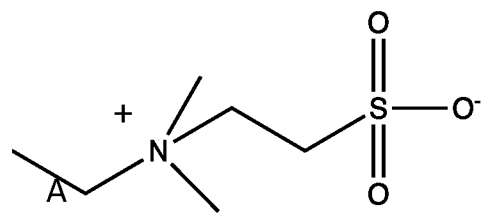
Figure 8A:
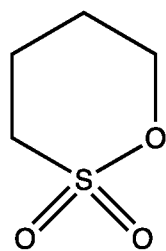
Figure 8B:
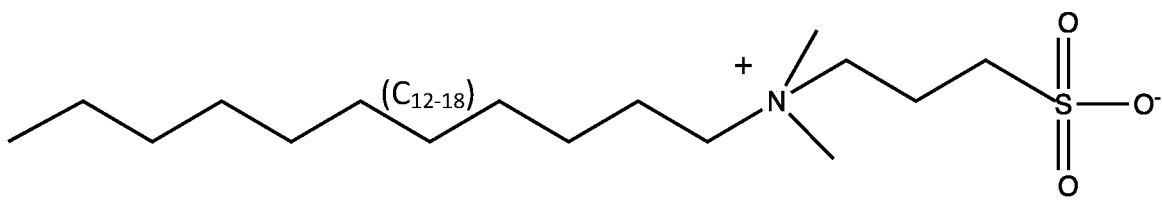
Figure 8C:
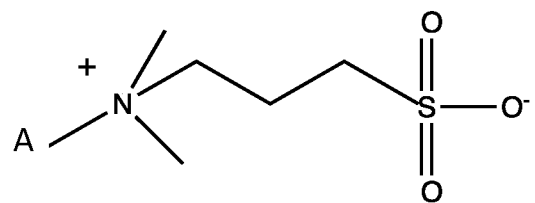

This application is the national phase entry of International Application No. PCT/TR2021/050269, filed on Mar. 25, 2021, which is based upon and claims priority to Turkish Patent Application No. 2020/04756, filed on Mar. 26, 2020, the entire contents of which are incorporated herein by reference.

TECHNICAL FIELD

The present invention relates to an antimicrobial formulation. In particular, the present invention relates to a stable aqueous formulation containing quaternary ammonium organosilane hydrolysate, and a method for producing same.

BACKGROUND

Quaternary ammonium compounds are known from Patent Application No. GB 1 233 854. U.S. Pat. No. 4,845,256A is directed to obtaining quaternary ammonium compounds with a high production rate.

Upon the hydrolysis of organosilanes having the structure $(C_{12-18})(CH_3)_2N^+(CH_2)_3Si(OR)_3$, antimicrobial condensation products having the structure $(C_{12-18})(CH_3)_2N^+(CH_2)_3Si(OZ)_{3-n}(OH)_n$ are formed. Wherein, "$C_{12-18}$" is a saturated or unsaturated aliphatic chain having 12 to 18 carbons; "R" is methyl or ethyl; "n" is an integer ranging from 0 to 2 (most likely 0 to 1). "Z" is a bonded partner consisting of one or more organosilane units, possibly containing higher order oligosilsesquioxane or polysilsesquioxane compounds.

Organosilanes having the structure $(C_{12-18})(CH_3)_2N^+(CH_2)_3Si(OR)_3$ are typically obtained by quaternizing a tertiary amine with a suitable chloropropyl organosilane reagent (i.e., alkylation of the tertiary amine functional group). Such reactions are usually carried out in the molten state or in the presence of a solvent. In each example known and cited, high temperatures and extended reaction times were applied in order to maximize quaternization and reaction efficiency.

Aqueous solutions of the product obtained by said reaction are typically prepared by dilution in water. According to experiences, when these aqueous solutions have a high concentration (e.g., 5% by weight), stability is insufficient and a polysilsesquioxane-type polymer precipitate is immediately formed. The aqueous solutions of the antimicrobial active agents within the scope described above having a concentration higher than 5% by weight, particularly 10% are not stable. Therefore, the variety of products that can be provided using such solutions is quite limited.

In order to improve shelf-life stability and thus to provide a marketable formulation, various chemical intervention techniques are used as typical solutions, such as pH readjustment, use of surfactant-type molecules and similar additives, coordination of free silanol ends with stabilizing molecules such as sugars and hydrophilic polymers, use of salt and their combinations in aqueous media. U.S. Pat. No. 5,411,585A1 relates to the use of surfactants to increase the stability of aqueous solutions containing quaternary ammonium compounds. U.S. Pat. No. 6,120,587 relates to the use of compounds containing multiple hydroxyl groups, particularly polyols, in order to increase the stability of organosilane compounds.

Since these strategies performed after quaternization are accompanied with extra costs, they negatively affect the sales price of the formulation. In addition, the use of stabilizing molecules and salts causes additional costs resulting from the need for washing after the product has been applied to a surface of a substrate and cured.

U.S. Pat. No. 8,541,610B2 relates to the reduction of said costs; however, the concentration range considered to be appropriate for the stability of the solutions obtained therein is up to 10% by weight, while the conversion rate is kept far from the quantitative value. After an aqueous solution of antimicrobial organosilanes obtained by quantitative conversion was prepared, precipitation was observed in a short time, and it is determined that the storage stability of said solution is low. In order to obtain a better understanding of the onset of precipitation, subsequent trials for quaternization were deliberately terminated early, without waiting for the completion of the reaction. Based on the value of the quantitative conversion rate, a viscous material that was found to be soluble in water up to 7% by weight was obtained without reaching the conversion rate of 60%. The aqueous composition containing said viscous material contains the targeted molecule (antimicrobial organosilane) as well as unconsumed starting materials and potentially their by-products. A relatively improved stability is achieved by keeping the conversion rate low, but the production efficiency of the active agent antimicrobial organosilane is partially compromised.

For the reasons listed above, there is still a need for further improvements in the relevant technical field.

The main object of the invention is to provide solutions to the problems mentioned in the prior art.

Another object of the invention is to provide a water-based antimicrobial organosilane formulation that is easy to manufacture and is cost-effective.

Another object of the invention is to provide a method for producing such formulation.

SUMMARY

The present invention proposes a stable formulation containing quaternary ammonium organosilane hydrolysate, and a method for producing same.

The formulation according to the present invention is;
an aqueous mixture containing antimicrobial organosilane having the structure $A(CH_3)_2N^+(CH_2)_3Si(OZ)_{3-n}(OH)_n$,
wherein "A" is a saturated or unsaturated aliphatic chain having 12 to 18 carbons, "n" is an integer ranging from 0 to 2, and "Z" is any one of one or more methyl or ethyl.

Said antimicrobial organosilane may also be called as a quaternary ammonium organosilane hydrolysate; which has the structure $A(CH_3)_2N^+(CH_2)_3Si(OR)_3$ when n=0, wherein "R" is methyl or ethyl.

The formulation also comprises a product of a reaction (second reaction) in which a tertiary amine in a starting material having the structure $A(CH_3)_2N$ is quaternized with one or more supplementary reactants selected from benzyl chloride, benzyl bromide, benzyl iodide, vinyl benzyl chloride, vinyl benzyl bromide, vinyl benzyl iodide, epichlorohydrin, epibromohydrin, epiiodohydrin, chloroethanoic acid, bromoethanoic acid, iodoethanoic acid, and sultones.

Sultone is preferably one of 1,3-propane sultone or 1,4-butane sultone, or a mixture thereof.

A method for obtaining said mixture comprises a chemical reaction (first reaction) in which the tertiary amine group contained in a starting material having the structure $A(CH_3)_2N$ is reacted with a reactant, in order to quaternize it by alkylation, followed by a chemical reaction (second reaction) in which the tertiary amine contained in a part of the starting material remaining unreacted in the first reaction is quaternized with one or more supplementary reactants selected benzyl chloride, benzyl bromide, benzyl iodide, vinyl benzyl chloride, vinyl benzyl bromide, vinyl benzyl iodide, epichlorohydrine, epibromohydrine, epiiodohydrin, chloroethanoic acid, bromoethanoic acid, iodoethanoic acid, and sultones, preferably 1,3-propane sultone or 1,4-butane sultone.

In a second version of the method, the production of the formulation includes a first step of obtaining or providing the antimicrobial organosilane as the first reaction product; a second step of obtaining or providing the second reaction product; and a third step for preparing a mixture of products obtained or provided in the first and second steps, such that a ratio of the sum of the molar concentrations of the first reaction product from the first step and the second reaction product from the second step to the concentration of the starting material having the structure $A(CH_3)_2N$ is 90:10 or higher.

DETAILED DESCRIPTION OF THE EMBODIMENTS

The present invention proposes a stable formulation containing quaternary ammonium organosilane hydrolysate, and a method for producing same.

In this study, using the basic principles of the synthesis method described in U.S. Pat. No. 8,541,610B2, and with the adaptations that are obvious to a skilled person, antimicrobial organosilanes having the structure $(C_{12-18})(CH_3)_2N^+(CH_2)_3Si(OZ)_{3-n}(OH)_n$ are obtained. Here, in said antimicrobial organosilanes, "$C_{12-18}$" is a saturated or unsaturated aliphatic chain having 12 to 18 carbons; "R" is methyl or ethyl; "n" is an integer ranging from 0 to 2; "Z" is one or more organosilanes. "n" is an integer ranging from 0 to 2, preferably 0 or 1.

Alternatively, it is a quaternary ammonium organosilane hydrolysate having the structure $A(CH_3)_2N^+(CH_2)_3Si(OZ)_{3-n}(OH)_n$, which has the structure $A(CH_3)_2N^+(CH_2)_3Si(OR)_3$ when n=0. Here and throughout the specification, "A" is a saturated or unsaturated aliphatic chain having 12 to 18 carbons; "n" is an integer ranging from 0 to 2, preferably it may be 0 or 1; "Z" is one or more alkyl groups selected from methyl and ethyl. In exemplary embodiments, "Z" may also be oligosilsesquioxane or polysilsesquioxane.

The formulation of the invention also comprises a product of a reaction (second reaction) in which the tertiary amine contained in a starting material having the structure $A(CH_3)_2N$ is quaternized with one or more supplementary reactants. Sultone is preferably one of 1,3-propane sultone or 1,4-butane sultone, or a mixture thereof.

In the present invention:
the term "reactant" refers to a halosilane having the structure $(CH_2)_3Si(OR)_3X$, wherein "X" is chlorine, bromine or iodine;
the term "supplementary reactant", different from "reactant", refers to one or more compounds selected from benzyl chloride, benzyl bromide, benzyl iodide, vinyl benzyl chloride, vinyl benzyl bromide, vinyl benzyl iodide, epichlorohydrin, epibromohydrin, epiiodohydrin, chloroethanoic acid, bromoethanoic acid, iodoethanoic acid, and sultones, preferably 1,3-propane sultone or 1,4-butane sultone.

Therefore, the product of the present invention can be described as follows:

An aqueous mixture containing antimicrobial organosilane having the structure $(C_{12-18})(CH_3)_2N^+(CH_2)_3Si(OZ)_{3-n}(OH)_n$, wherein $C_{12-18}$ is a saturated or unsaturated aliphatic chain having 12 to 18 carbons; R is methyl or ethyl; n is an integer ranging from 0 to 2, Z is one or more organosilanes; wherein the ratio of the molar concentration of the antimicrobial organosilane to the molar concentration of the starting material having the structure $(C_{12-18})(CH_3)_2N$ is 90:10 or higher.

The ratio of the molar concentration of the antimicrobial organosilane to the initial molar concentration is preferably 95:10 or higher.

In the aqueous mixture, being the product, the sum of the concentrations of said antimicrobial organosilane and the second reaction product can preferably be above 15% by weight based on the total weight of the aqueous mixture. Despite this high concentration, stability is maintained for a long period of time.

The aqueous mixture may be provided without a surfactant, polyol and sugar as a stabilizer, yet maintains its stability for a long period of time.

It has been observed that the aqueous solutions/mixtures prepared from the reaction products obtained by the method of the invention can reach concentrations up to 95% by weight based on the total weight of the aqueous solution/mixture, and maintain their stability even at these high concentrations. It has been observed that the stability of the aqueous solution is maintained even longer periods of time especially at concentrations slightly above 5% by weight (based on the total weight of the aqueous solution), which is also regarded as a high concentration. It has been observed that the solubility, surface applicability, post-curing bond strength, and antimicrobial activity characteristics of the aqueous stocks at a concentration of 7% by weight, based on the total weight of the aqueous solution, are preserved after 24-30 weeks of storage at room temperature.

With the present application, a method for obtaining the formulation of the invention is also proposed.

First Version of the Method:

A version of the method (first version) comprises subjecting the tertiary amine group contained in a starting material having the structure $A(CH_3)_2N$ to a chemical reaction (first reaction) with a reactant having the structure $(CH_2)_3Si(OR)_3X$ wherein X is chlorine, bromine or iodine, in order to quaternize it by alkylation. A quaternary ammonium organosilane hydrolysate having the structure $A(CH_3)_2N^+(CH_2)_3Si(OZ)_{3-n}(OH)_n$ is obtained as the product of the first reaction. According to the first version of the method of the invention, the first reaction is stopped at a conversion rate of 45% to 70%, preferably 55% to 65%, more preferably 60%, before all the starting material is consumed. One way is that the molar concentration of the reactant at the start of the first reaction (i.e., the initial concentration of the reactant) is less than the initial concentration of the starting material, in order to determine the reactant (halosilane) as the restricting component. Accordingly, the initial molar concentration of the reactant is in the range of 45% to 70%, preferably 55% to 65%, more preferably 60% of the initial molar concentration of the starting material. The first version of the method of the present invention includes performing a second reaction following the first reaction. The second reaction is a chemical reaction in which the tertiary amine contained in a part of the starting material that has remained unreacted in the first reaction is quaternized with one (or more) supplementary reactant (selected from benzyl chloride, benzyl bromide, benzyl iodide, vinyl benzyl chloride, vinyl benzyl bromide, vinyl benzyl iodide, epichlorohydrin, epibromohydrin, epiiodohydrin, chloroethanoic acid, bromoethanoic acid, iodoethanoic acid, and sultones, preferably 1,3-propane sultone or 1,4-butane sultone). Accordingly, at the end of the first reaction, the unconverted portion of the starting material having the structure $A(CH_3)_2N$ is consumed/converted by quaternization, using for example a stoichiometric amount of the supplementary reactant.

In other words, said version of the method of the invention can be summarized as follows:
performing the following steps for preparation of an aqueous mixture containing antimicrobial organosilane having the structure $(C_{12-18})(CH_3)_2N^+(CH_2)_3Si(OZ)_{3-n}(OH)$, (i.e., having the structure $A(CH_3)_2N^+(CH_2)_3Si(OZ)_{3-n}(OH)_n$) wherein $C_{12-18}$ is a saturated or unsaturated aliphatic chain having 12 to 18 carbons; R is methyl or ethyl; n is an integer ranging from 0 to 2; Z is one or more organosilanes:
(a) quaternization of a tertiary amine group of the starting material by alkylation through a reaction with a halosilane, such that the conversion rate of the starting material (having the structure $A(CH_3)_2N$) is in the range of 45% to 70%;
(b) quaternizing at least 90% of the part of the starting material that has not been converted into antimicrobial organosilane, by adding a supplementary reactant according to the list above into the reaction medium.

Thus, at the end of step (b), a mixture is obtained in which the ratio of the sum of the molar concentrations of the first reaction product and the second reaction product to the concentration of the starting material having the structure $A(CH_3)_2N$ is 90:10 or higher. Preferably, in step (b), at least 95% of the part of the starting material that has not been converted into antimicrobial organosilane is quaternized so that said ratio is higher than 95:10. More preferably, in step (b), all of the starting material that has not been converted into antimicrobial organosilane is quaternized so that the starting material having the structure $A(CH_3)_2N$ is absent in the mixture.

Antimicrobial organosilanes having the structure $A(CH_3)_2N^+(CH_2)_3Si(OZ)_{3-n}(OH)_n$ obtained as the product of the first reaction are soluble in water as expected. As the restricting component to be taken into account in the calculation of the conversion rate, the starting material having the structure $A(CH_3)_2N$ can be considered. The conversion rate of the starting material of about 60% that is achieved at the end of the first reaction (i.e., in step (a)) is taken up with the second reaction up to the conversion rates close to the quantitative value (conversion rate of 90% or more, preferably 95% or more, more preferably 100%). Here, the value of the "quantitative" conversion rate corresponds to the conversion rate to be achieved when the stoichiometrically restricting component among the agents in the first reaction is exhausted, preferably the starting material having the structure $A(CH_3)_2N$ is exhausted.

Preferably, the chemical reaction in step (a) can be terminated when the conversion rate of the starting material is in the range of 55% to 65%. More preferably, the chemical reaction in step (a) is terminated when the conversion rate of the starting material is about 60%, or more preferably exactly 60%. When the starting material remaining unconverted in step (a), where the first reaction takes place, is subjected to step (b) where the second reaction takes place, at least 90%, preferably at least 95%, even more preferably all of the amount of starting material at the beginning of step (a) is converted/consumed.

In addition to the antimicrobial organosilane having the structure $A(CH_3)_2N^+(CH_2)_3Si(OZ)_{3-n}(OH)_n$ and the starting material having the structure $A(CH_3)_2N$ that is used to obtain it, the composition obtained at the end of the reaction in step (a) of the first version may contain potential by-products resulting from the quaternization process. The quaternization, which is partially performed with the first reaction, may be promoted or even completed with the second reaction as mentioned above. Thus, owing to a substantial conversion/quaternization of the starting material amine compound having the structure $A(CH_3)_2N$ (i.e., with high conversion rates practically corresponding to complete conversion, preferably 90% or higher, more preferably 95% or higher), an aqueous formulation that is stable even at high concentrations can be obtained.

After the above-mentioned step (a), the amine compound having the structure $A(CH_3)_2N$, which remains unreacted, is also converted into the second reaction product by quaternization using the supplementary reactant. The second reaction product is water-soluble and provides improved stability in the aqueous formulation regardless of concentration. In other words, assuming that an amount of the starting material (i.e., the amine compound having the structure $A(CH_3)_2N$) corresponding to the difference of the conversion rate achieved at the end of the first reaction from 100%, and some chlorosilane as the first reactant remain in the reaction medium, the starting material remaining unreacted is subjected to quaternization in the second reaction and converted into the product of the second reaction. Thus, with a substantial conversion (i.e., consumption) of the starting material, the solubility of all materials in the reaction medium in water (i.e., water compatibility, or the tendency to form a stable mixture/emulsion with water) can be further improved. Thus, stability is improved in the present invention. Thus, in the aqueous mixture of the invention, it is ensured that the ratio of the sum of the molar concentrations of the first reaction product, i.e., the antimicrobial organosilane having the structure $A(CH_3)_2N^+(CH_2)_3Si(OZ)_{3-n}(OH)_n$, and the second reaction product, to the molar concentration of the starting material having the structure $A(CH_3)_2N$ is 90:10 or higher, more preferably 95:5 or higher.

The first version above can be realized with a relatively low investment cost by preparing the antimicrobial organosilane and the second reaction products included in the formulation of the invention in a single reaction medium, thereby providing an advantage in terms of process economy.

Second Version of the Method:

As an alternative that provides ease of application, by combining the products of the first and second reactions after having been obtained in different reaction mediums, in appropriate proportions, the following second version may also be applied. In the second version, which is an alternative to the method of the invention, it is also possible to obtain the formulation by performing the following steps:
i) providing a first reaction product, i.e., an antimicrobial organosilane having the structure $A(CH_3)_2N^+(CH_2)_3Si(OZ)_{3-n}(OH)_n$ by quaternizing the tertiary amine group of the starting material by alkylation, with a conversion rate of at least 90%, through a reaction with a halosilane;

ii) providing a second reaction product wherein the starting material is quaternized with the supplementary reactant to a conversion rate of at least 90%;

iii) forming an aqueous mixture containing the first and second reaction products. With this step, it is inevitably ensured that the ratio of the sum of the molar concentrations of the first reaction product from step (i) above and the second reaction product from step (ii) to the concentration of the starting material having the structure $A(CH_3)_2N$ is 90:10 or higher.

Preferably, the reactions in steps (i) and (ii) are continued until the conversion rate of the starting material reaches 95% or higher. In this case, in the mixture obtained in step (iii), the ratio of the sum of the molar concentrations of the first reaction product from step (i) and the second reaction product from step (ii) to the concentration of the starting material having the structure $A(CH_3)_2N$ reaches 95:5 or higher.

More preferably, the reactions in steps (i) and (ii) are continued until the conversion rate of the starting material is 100%. Thus, it is ensured that the starting material having the structure $A(CH_3)_2N$ is absent in the mixture obtained in step (iii).

Preferably, in the mixture obtained in step (iii), the ratio of the molar concentration of the first reaction product from step (i) to the molar concentration of the second reaction product from step (ii) is in the range of 45:65 to 70:30, more preferably 55:45 to 65:35, even more preferably it is 60:40.

The formulations obtained according to the first and second versions of the method described above have surprisingly been found to have a high storage stability that is unpredictable from the prior art. In particular, it has been observed that said high stability can be achieved without requiring additives or other chemical interventions mentioned in the prior art.

When the value of quantitative conversion rate is accepted to be 100%, at the end of step (b) in the first version or steps (i) and (ii) in the second version, the conversion rate in the reaction between the starting material and the halosilane (e.g., chlorosilane) is around 90% or higher, preferably above 95% (e.g., 100%). In this case, as a result of the reaction, in the reaction medium (accordingly in a final product obtained from the reaction mixture), the ratio of the molar concentration of the antimicrobial organosilane having the structure $(C_{12-18})(CH_3)_2N^+(CH_2)_3Si(OZ)_{3-n}(OH)_n$ to the molar concentration of the starting material organosilane having the structure $(C_{12-18})(CH_3)_2N^+(CH_2)_3Si(OR)_3$ is 90:10 or higher. Thus, in an aqueous mixture (for example, in a water-based final product) containing the antimicrobial organosilane having the structure $(C_{12-18})(CH_3)_2N^+(CH_2)_3Si(OZ)_{3-n}(OH)_n$, long-term stability is made possible even in cases where said antimicrobial organosilane has a concentration above 15% by weight based on the total weight of the aqueous mixture. The aqueous mixture obtained by the invention is capable of maintaining its stability for a long period of time, regardless of the concentration of the antimicrobial organosilane, without requiring the addition of stabilizing materials such as surfactants, polyols and sugars.

In the context of the present invention, the term "stability" is used to refer to the retention of one or more of the following characteristics over a long period of time: compatibility with aqueous medium, water solubility, surface applicability, bond strength after curing, and antimicrobial activity.

With the formulation of the invention (water-based antimicrobial organosilane formulation) and the method alternatives that make it possible, stable aqueous solutions which may contain quaternary organosilane at any concentration can be obtained without requiring stabilizers, pH adjustment and other chemical intervention means. When said composition and aqueous solutions containing same are applied on various substrates and cured, an antimicrobial quaternary organopolysilsesquioxane coating is obtained.

With the present invention, additional costs resulting from additional chemical interventions to improve the stability of the formulation are eliminated. Furthermore, since said chemical interventions are not required, additional molecules such as stabilizing salts or sugars (e.g., simple sugars) are not incorporated into the formulation, thus, when the formulation is applied to a substrate and cured, it does not need to be washed off. Therefore, with the present invention, an antimicrobial formulation that is easy to manufacture and highly cost-effective is provided.

What is claimed is:

1. A method for obtaining an antimicrobial aqueous formulation containing a quaternary ammonium organosilane hydrolysate having a structure $A(CH_3)_2N^+(CH_2)_3Si(OZ)_{3-n}(OH)_n$, wherein "A" is a saturated or unsaturated aliphatic chain having 12 to 18 carbons, "n" is an integer ranging from 0 to 2, "Z" is at least one oligosilsesquioxane or polysilsesquioxane, or at least one alkyl group selected from a methyl group and an ethyl group; the method comprising steps of:

(a) quaternizing a tertiary amine group of a starting material by an alkylation through a reaction with a halosilane, wherein a conversion rate of the starting material is in a range of 55% to 65%;

(b) quaternizing at least 90% of a part of the starting material not been converted into an antimicrobial organosilane by reacting with at least one supplementary reactant, wherein the starting material comprises a structure $A(CH_3)_2N$, wherein the "A" is the saturated or unsaturated aliphatic chain having 12 to 18 carbons; and wherein the at least one supplementary reactant is selected from benzyl chloride, benzyl bromide, benzyl iodide, vinyl benzyl chloride, vinyl benzyl bromide, vinyl benzyl iodide, epichlorohydrine, epibromohydrin, epiiodohydrin, chloroethanoic acid, bromoethanoic acid, iodoethanoic acid, and sultone; and wherein step (a) and step (b) are realized in a single reaction medium.

2. The method according to claim 1, wherein the sultone is 1,3-propane sultone, 1,4-butane sultone, or a mixture of the 1,3-propane sultone and the 1,4-butane sultone.

3. The method according to claim 1, wherein based on an amount of the starting material having the structure $A(CH_3)_2N$ at a beginning of the step (a), the step (b) is continued until at least 95% of the amount of the starting material is quaternized.

4. The method according to claim 1, wherein an unconverted portion of the starting material having the structure $A(CH_3)_2N$ is consumed by a quaternization in the step (b) using a stoichiometric amount of the at least one supplementary reactant.

5. An antimicrobial aqueous formulation obtained by the method according to claim 1, wherein the antimicrobial aqueous formulation comprises:

the quaternary ammonium organosilane hydrolysate having the structure $A(CH_3)_2N^+(CH_2)_3Si(OZ)_{3-n}(OH)_n$ obtained in the step (a), wherein the "A" is the saturated or unsaturated aliphatic chain having 12 to 18 carbons, the "n" is the integer ranging from 0 to 2, the "Z" is the at least one oligosilsesquioxane or polysilsesquioxane, or the at least one alkyl group selected from the methyl group and the ethyl group; and a reaction product obtained in the step (b).

6. The antimicrobial aqueous formulation according to claim 5, wherein a ratio of a sum of molar concentrations of the quaternary ammonium organosilane hydrolysate and the reaction product to a concentration of the starting material having the structure $A(CH_3)_2N$ is 95:10 or higher.

7. The antimicrobial aqueous formulation according to claim 5, wherein the starting material having the structure $A(CH_3)_2N$ is absent in the antimicrobial aqueous formulation.

8. The antimicrobial aqueous formulation according to claim 5, wherein a value of the "n" is 0 or 1.

9. The antimicrobial aqueous formulation according to claim 8, wherein the value of the "n" is 0.

10. The antimicrobial aqueous formulation according to claim 5, wherein the "Z" is the at least one oligosilsesquioxane or polysilsesquioxane.

11. The method according to claim 2, wherein based on an amount of the starting material having the structure $A(CH_3)_2N$ at a beginning of the step (a), the step (b) is continued until at least 95% of the amount of the starting material is quaternized.

12. The method according to claim 2, wherein an unconverted portion of the starting material having the structure $A(CH_3)_2N$ is consumed by a quaternization in the step (b) using a stoichiometric amount of the at least one supplementary reactant.

13. The antimicrobial aqueous formulation according to claim 5, wherein in a process of preparing the antimicrobial aqueous formulation, the sultone is 1,3-propane sultone, 1,4-butane sultone, or a mixture of the 1,3-propane sultone and the 1,4-butane sultone.

14. The antimicrobial aqueous formulation according to claim 5, wherein in a process of preparing the antimicrobial aqueous formulation, based on an amount of the starting material having the structure $A(CH_3)_2N$ at a beginning of the step (a), the step (b) is continued until at least 95% of the amount of the starting material is quaternized.

15. The antimicrobial aqueous formulation obtained according to claim 5, wherein in a process of preparing the antimicrobial aqueous formulation, an unconverted portion of the starting material having the structure $A(CH_3)_2N$ is consumed by a quaternization in the step (b) using a stoichiometric amount of the at least one supplementary reactant.

16. The antimicrobial aqueous formulation according to claim 6, wherein a value of the "n" is 0 or 1.

17. The antimicrobial aqueous formulation according to claim 7, wherein a value of the "n" is 0 or 1.

18. The antimicrobial aqueous formulation according to claim 6, wherein the "Z" is the at least one oligosilsesquioxane or polysilsesquioxane.

19. The antimicrobial aqueous formulation according to claim 7, wherein the "Z" is the at least one oligosilsesquioxane or polysilsesquioxane.

20. The antimicrobial aqueous formulation according to claim 8, wherein the "Z" is the at least one oligosilsesquioxane or polysilsesquioxane.

* * * * *